May 20, 1952 J. F. CONNOR 2,597,294
WHEELED SHOPPING BAG
Filed Sept. 28, 1948
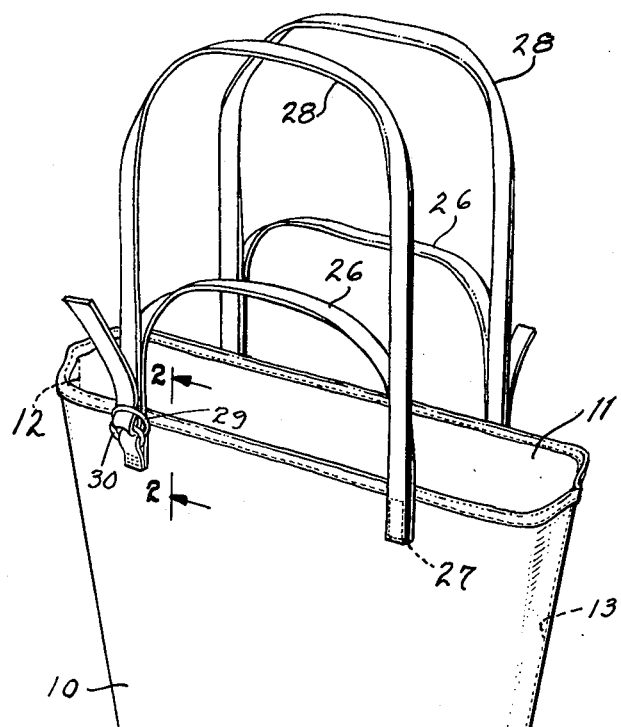
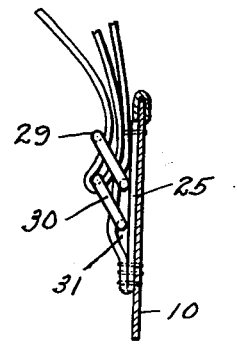
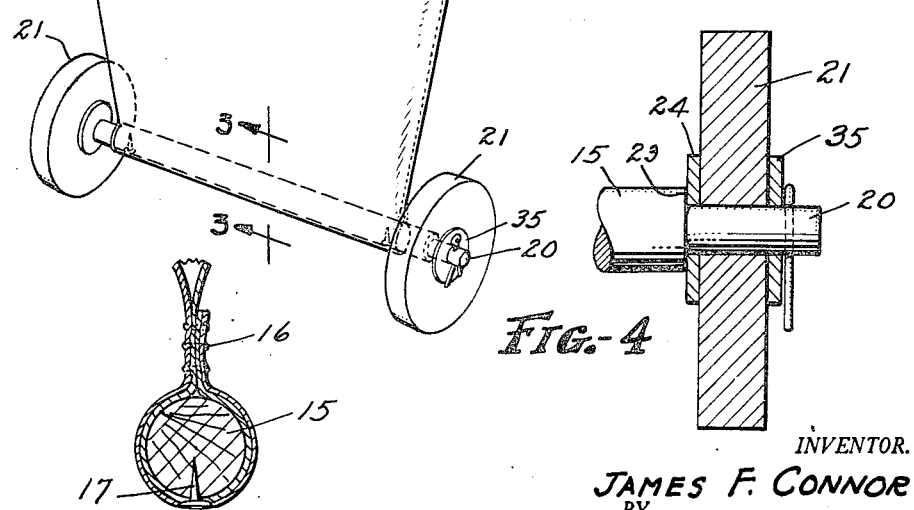
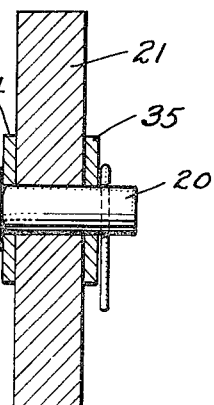
INVENTOR.
JAMES F. CONNOR
BY
Bates, Teare & McBean
ATTORNEYS Patented May 20, 1952

2,597,294

UNITED STATES PATENT OFFICE 2,597,294

WHEELED SHOPPING BAG

James F. Connor, Cleveland, Ohio

Application September 28, 1948, Serial No. 51,527

2 Claims. (Cl. 280—51)

This invention relates to shopping bags and has for one of its objects the provision of a bag which may be carried by the hand or rolled along the street, but when not in use may be rolled up into a compact package.

An additional object is to construct a bag of such shape that articles therein will wedge themselves to the bottom of the bag and thereby position the load automatically over the axle and thus avoid the likelihood of the bag being dragged upon the ground. In this connection, the invention includes a handle construction by means of which the length of the handles may be readily adjusted to suit the convenience of the user.

Referring now to the drawings, Fig. 1 is a perspective view of a shopping bag embodying the present invention; Figs. 2 and 3 are sections taken through planes indicated by the correspondingly numbered lines in Fig. 1, and Fig. 4 is a vertical section taken through one of the supporting wheels.

The bag which embodies the present invention may comprise two panels 10 and 11 which are preferably wedge-shaped and which may be made of canvas, or any other suitable flexible material. The panels are connected together as by sewing along the longitudinal edges 12 and 13 respectively, while the bottom portions may be wrapped around an axle 15 and then attached, as by stitching 16, to the panel, as is shown particularly in Fig. 3. When the axle is made of wood, the bag may additionally be secured thereto by means of tacks 17 so as to prevent rotation of the bag with reference to the axle.

By making the bag panels of wedge-shaped formation, the contents tend to wedge themselves against the bottom of the bag directly over the axle and thereby tend to centralize the load with respect to the axle. The axle is shown as having a reduced portion 20 at each end upon which wheels 21 are journalled and are retained in place by means of a cotter pin 22. The reduced portion of the axle provides a shoulder 23 against which a washer 24 is adapted to engage while another washer 35 is shown as being disposed between the wheel and the cotter pin.

Each panel of the bag is provided with a pair of handles, one of which is fixed and the other adjustable. The handles on each panel are formed preferably by means of a single strip of fabric, one end of which is fastened, as at 25, to the panel and then is bent backwardly upon itself and extended upwardly and transversely of the bag to form a lower fixed handle 26. The strip is then attached to the panel, as at 27, and is folded back upon itself to provide an adjustable handle 28. The end of the handle 28 may then be adjustably positioned between rings 29 and 30 which are held within the bight 31 that is formed by the initial portion 25 of the strip.

An advantage of the invention is the fact that the container and handles may be rolled around the axle for convenience in storage or for carrying while the bag is empty. A further advantage is the fact that the wedge-shaped construction in a direction parallel to the axle facilitates not only loading of the bag, but also centralization of the load over the axle so as to avoid the likelihood of the bag being dragged upon the ground while being rolled along the sidewalk. The bag may be economically manufactured and can readily be lifted onto a car or other conveyance by means of the fixed handles.

I claim:

1. A shopping bag comprising a container, an axle, means for attaching the container at only the lower end thereof to the axle, a pair of wheels journalled on the axle, and a strap having one end thereof attached to the container and having an intermediate portion also attached to the container to provide a fixed handle, the strap then extending upwardly above the fixed handle and having its free end adjustably attached to the container and providing an adjustable handle for the bag.

2. A shopping bag comprising a flexible container which is tapered upwardly from bottom to top in every transverse direction, an axle attached to the container, wheels journalled on the axle, the narrowest portion of the taper being at the bottom and positioned directly over the center of the axle, handles attached to the container only at the top, there being one handle on each side, and each handle comprising a U-shaped flexible strap, said wheels being positioned outside the confines of the lower portion of the bag but disposed within the confines of the upper portion of the bag.

JAMES F. CONNOR.

REFERENCES CITED

The following references are of record in the file of this patent:

UNITED STATES PATENTS

| Number | Name | Date |
| --- | --- | --- |
| 1,229,933 | Gahen | June 12, 1917 |
| 1,276,322 | Bullock | Aug. 20, 1918 |
| 1,822,893 | Kapolkin | Sept. 15, 1931 |
| 2,208,347 | Stuart | July 16, 1940 |
| 2,228,066 | Tashbook | Jan. 7, 1941 |
| 2,459,865 | Bourne | Jan. 25, 1949 |
| 2,465,847 | Coffey | Mar. 29, 1949 |